(12) United States Patent
Lee

(10) Patent No.: US 6,440,502 B1
(45) Date of Patent: Aug. 27, 2002

(54) METHOD OF FABRICATING A TAPE FOR TAPE RULE

(76) Inventor: Shih-Lin Lee, No. 22, Lane 81, Sec. 2, Tunha S. Road, Taipei City (TW)

( * ) Notice: Subject to any disclaimer, the term of this patent is extended or adjusted under 35 U.S.C. 154(b) by 0 days.

(21) Appl. No.: 09/678,389

(22) Filed: Oct. 3, 2000

(51) Int. Cl.[7] .............................. B05D 1/28; B05D 3/06; B05D 7/16

(52) U.S. Cl. .................. 427/542; 427/557; 427/595; 427/211; 427/258; 427/287; 427/388.1; 427/409; 427/428

(58) Field of Search .............................. 427/542, 557, 427/409, 388.1, 258, 211, 287, 595, 428

(56) References Cited

U.S. PATENT DOCUMENTS 4,362,775 A * 12/1982 Yabe et al. ................. 428/213
4,370,387 A * 1/1983 Ueno et al. ................. 428/458
5,738,743 A * 4/1998 Lee ............................. 156/153
5,863,624 A * 1/1999 Miyazaki et al. .......... 428/35.9

* cited by examiner

Primary Examiner—Shrive P. Beck
Assistant Examiner—Kirsten A. Crockford
(74) Attorney, Agent, or Firm—Rosenberg, Klein & Lee

(57) ABSTRACT

A method of fabricating a tape for a tape rule disclosed herein comprises the steps of adding a dyestuff into a polyester material mixed with a binding glue and churning the mixture so as to offer the polyester material a specified color; adhering the colored polyester material by rolling with a 150° C. hot roller to both surfaces of a steel tape so as to form a base coat film; printing graduations on one or both surfaces of the tape already having the base coating; drying the tape by infrared radiation; rolling a mixture of a transparent polyester and a binding glue with the 150° C. hot roller on both surfaces of the tape to form a protecting layer; and finishing fabrication of the tape. The tape fabricated is flat, stiff, flexible, and friction resistant, also capable of saving production costs.

4 Claims, 2 Drawing Sheets

METHOD OF FABRICATING A TAPE FOR TAPE RULE

BACKGROUND OF THE INVENTION

1. Field of the invention

The present invention relates to method of fabricating a tape for tape rule, and more particularly, to a method in which a colored polyester film is coated on both surfaces of a steel tape as base coat thereby forming a non-poisonous, environment-conscious and low cost tape for tape rule.

2. Description of the Prior Art

FIG. 1 shows a fundamental flow chart illustrating a conventional method of fabricating a tape for tape rule, the fabricating steps are:

1. Preparing a roll of originally colored metallic tape 11;
2. Forming a base coat layer by adhering aluminum foil or baking paint on both tape surfaces 12;
3. Printing graduations on the tape which already having being finished base coating 13;
4. Coating a polyester film 14 on both tape surfaces after printing graduations 13;
5. Trimming and burling flashes of the aluminum foil and the polyester film 15; and
6. Finishing a tape product 16.

In the conventional fabricating method generally adopted by manufactures, the paint used as base coat induces a serious problem. As it is well known, any colored painting materials usually contain poisonous chemical compounds with heavy metals and a stimulating odor not only harmful to manufacturing personnel who constantly contact it, but also air polluting. The product of a tape rule made as such is possibly harmful and is by no means a good product.

Except making procedure is complicated. Foams are too apt to be produced between the aluminum foil and the polyester film as the two are not so compatible to attract firmly with each other thereby reducing yield of the tape fabrication that leads to a waste of production cost. Besides, owing to rather large thickness of aluminum foil, the thickness of steel sheet used to form the tape body must be reduced as thin as possible with the result that the finished tape product is in lack of stiffness and flexibility as well.

Furthermore, no matter whether the base coat is formed of aluminum foil or of baked paint, both require a considerably high fabrication cost, as a result, users have to pay a higher price to purchase a tape rule whose tape is formed as such.

In order to overcome the shortcomings inherent to the conventional technique described above, the present inventor has delved into this matter with a long time efforts and came to realization of the present invention.

SUMMARY OF THE INVENTION

It is an object of the present invention to provide method of fabricating a nonpoisonous tape for tape rule.

It is another object of the present invention to provide method of fabricating a tape having proper stiffness, flatness and flexibility, for tape rule.

It is still another object of the present invention to provide method of fabricating a tape with a good color rendering, and easy for observing its graduations thereon for measurement.

The above mentioned objects and other advantages of the present invention will be achieved by the method of fabricating a tape for tape rule comprising the steps of:

1. Adding a dyestuff into a polyester material mixed with a binding glue and churning the. mixture so as to offer the polyester material a specified color.
2. Adhering the colored polyester prepared in step 1 by rolling with a roller which is maintained at a constant temperature of 150° C., to both surfaces of the tape so as to form a colored base coat of the tape.
3. Printing graduations on a surface (or both surfaces) of the tape and then carrying out infrared drying.
4. Rolling a mixture of a transparent polyester and a binding glue with a roller maintained at a constant temperature of 150° C. on the tape, to form a polyester protecting layer on both tape surfaces.
5. Finishing fabrication of a polyester film coated tape for tape rule.

The base coat formed in step 2 makes the finished tape non-poisonous and environment-conscious. In addition, the polyester film of the present invention is thinner than the aluminum foil or the baked paint formed by conventional techniques, consequently, a thicker steel strip can be used to form the tape which results in upgrading stiffness and flexibility of the finished tape.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
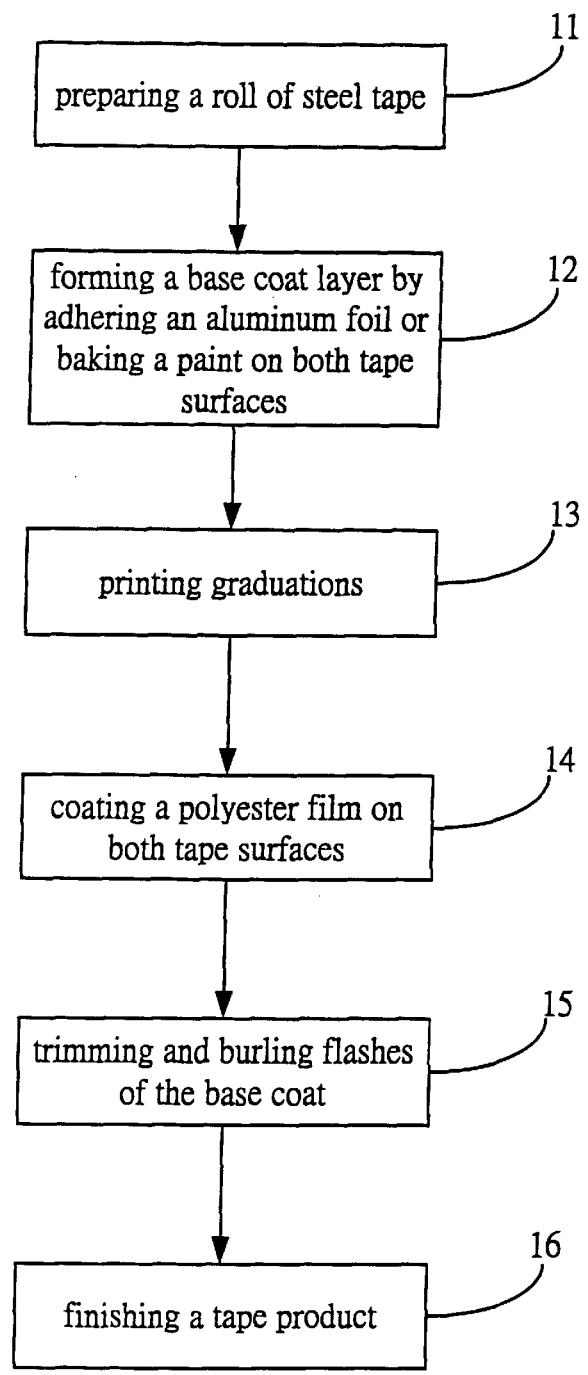
FIG. 1 is a fundamental flow chart showing the steps of fabricating a tape for tape rule according to conventional techniques.

The conventional fabricating steps of a tape illustrated in FIG. 1 have already been describe above so that it will not be repeated again.

Figure 2:
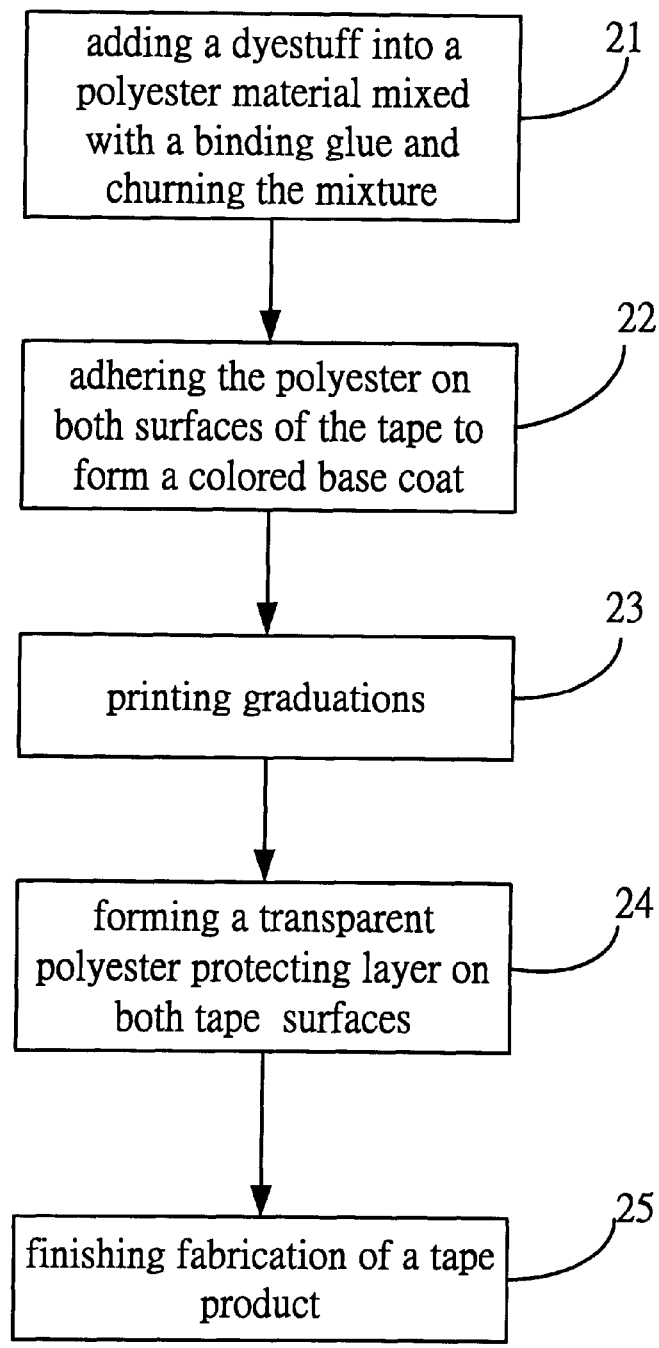
FIG. 2 is a fundamental flow chart showing the steps of fabricating a tape for tape rule according to the present invention.

The fabricating method of a tape according to the present invention shown in FIG. 2 comprises the steps:

1. Adding a dyestuff into a polyester material mixed with a binding glue and churning the mixture so as to offer the polyester material a specified 21.
2. Adhering the colored polyester prepared in step 1 by rolling with a roller which is maintained at a constant temperature of 150° C., to both surfaces of a steel tape (in original metallic color) so as to form a 15 um thick colored base coat on the steel tape, and preventing foams from being produced between the tape surfaces and the polyester base coat so as to maintain the tape in flat state, and then winding up the tape which is finished base coating around a reel 22.
3. Printing graduations on a surface (or both surfaces) of the steel tape treated with base coating in step 2, and then drying the tape by infrared ray 23.
4. Rolling a mixture of a transparent polyester and a binding glue with a roller maintained at a constant temperature of 150° C. on both surfaces of the tape after having been printed graduations in step 3, so as to form an anti-friction protecting layer 24.
5. Finishing fabrication of a polyester film coated tape for tape rule 25.

Meanwhile, the base coat formed in step 2 is non-poisonous and is in comply with requirement of environment protection. In addition, the polyester film of the present invention either used as base coat or as a protecting layer can be formed thinner than the aluminum foil or the baked paint formed by conventional technique, consequently, a thicker steel strip can be employed to form the tape which results in upgrading stiffness and flexibility of the finished tape.

In summary, the present invention is superior to any other conventional technique by the facts of using non-poisonous base coat, possibility of forming thinner film both for base coat and protecting layer thereby upgrading stiffness and flexibility of the finished tape through utilizing thicker steel strip for the tape, and thus saving overall fabrication cost and reducing price of the tape rule.

Many changes and modifications in the above described embodiment of the present invention can, of course, be carried out without departing from the scope thereof. Accordingly, to promote the progress in science and the useful arts, the invention is disclosed and is intended to be limited only by the scope of the appended claims.

What is claimed is:

1. A method of fabricating a tape for a tape rule comprising the steps of:
   (a) establishing a flexible steel tape substrate having opposed first and second surfaces;
   (b) churning a first mixture including a dyestuff component, a polyester material component, and a binding glue component to form a colored polyester material;
   (c) hot rolling said colored polyester material onto said tape substrate at a predetermined constant temperature to form a coated tape substrate having disposed on each of said opposed first and second surfaces a base coat film layer;
   (d) applying indicia to said base coat film layer of at least said first surface;
   (e) drying said coated tape by exposure to infrared radiation;
   (f) forming a second mixture including a substantially transparent polyester material component and a binding glue component; and,
   (g) hot rolling at said predetermined constant temperature said second mixture and said coated tape substrate to form a flexible finished tape having a protecting layer disposed over said base coat film layer of each said first and second surface.

2. The method of fabricating a tape for a tape rule as recited in claim 1 wherein said predetermined constant temperature equals approximately 150 degrees C.

3. The method of fabricating a tape for a tape rule as recited in claim 1 wherein said base coat film layer is conformingly hot rolled over each said first and second surface of said coated tape substrate to overlay each said first and second surface in substantially uniform manner.

4. The method of fabricating a tape for a tape rule as recited in claim 1 wherein said base coat film layer is formed to be approximately 15 microns in thickness over each of said first and second tape substrate surfaces.

* * * * *